United States Patent
Hall

[11] 3,765,151
[45] Oct. 16, 1973

[54] HEAD POLE SUPPORT FOR HORSE HARNESS

[76] Inventor: George E. Hall, 8317 Lovers Ln., Portage, Mich. 49002

[22] Filed: Mar. 13, 1972

[21] Appl. No.: 233,906

[52] U.S. Cl. .................................... 54/71, 24/239
[51] Int. Cl. ............................................. B68b 1/00
[58] Field of Search .................... 54/2, 35, 38, 57, 54/70, 71; 119/96, 126; 24/239

[56] References Cited
UNITED STATES PATENTS

| 2,854,801 | 10/1958 | Spiezio et al. | 54/71 |
| 872,347 | 12/1907 | Howell | 54/71 |
| 302,509 | 7/1884 | Mauthner | 24/239 |
| 1,340,206 | 5/1920 | Ballou, Jr. | 24/239 |

FOREIGN PATENTS OR APPLICATIONS

| 229,514 | 7/1960 | Australia | 54/71 |

Primary Examiner—Louis G. Mancene
Assistant Examiner—J. A. Oliff
Attorney—Woodhams, Blanchard & Flynn

[57] ABSTRACT

A head pole attachement adapted to be connected to the harness of a horse for preventing lateral or sidewise movement of the horse's head. The attachment includes an elongated telescoping pole which has the front end thereof positioned adjacent one side of the horse's head, with the rearward end thereof being mounted to a portion of the harness, particularly the back pad. A bracket structure is releasably mounted on the back pad between the water check hook and one of the line guide rings. A universal-type coupling is mounted on the bracket and is laterally adjustable along the bracket for selectively positioning same at any desired location between the water check hook and the line guide ring. The universal coupling has means for permitting it to be easily detachably connected to the rearward end of the pole, thereby enabling the pole to pivotally swing relative to the back pad about two substantially perpendicular axes. The pole has a spring-urged locking sleeve mounted on the rearward end thereof for permitting the pole to be releasably pivotally connected to the coupling device.

10 Claims, 6 Drawing Figures

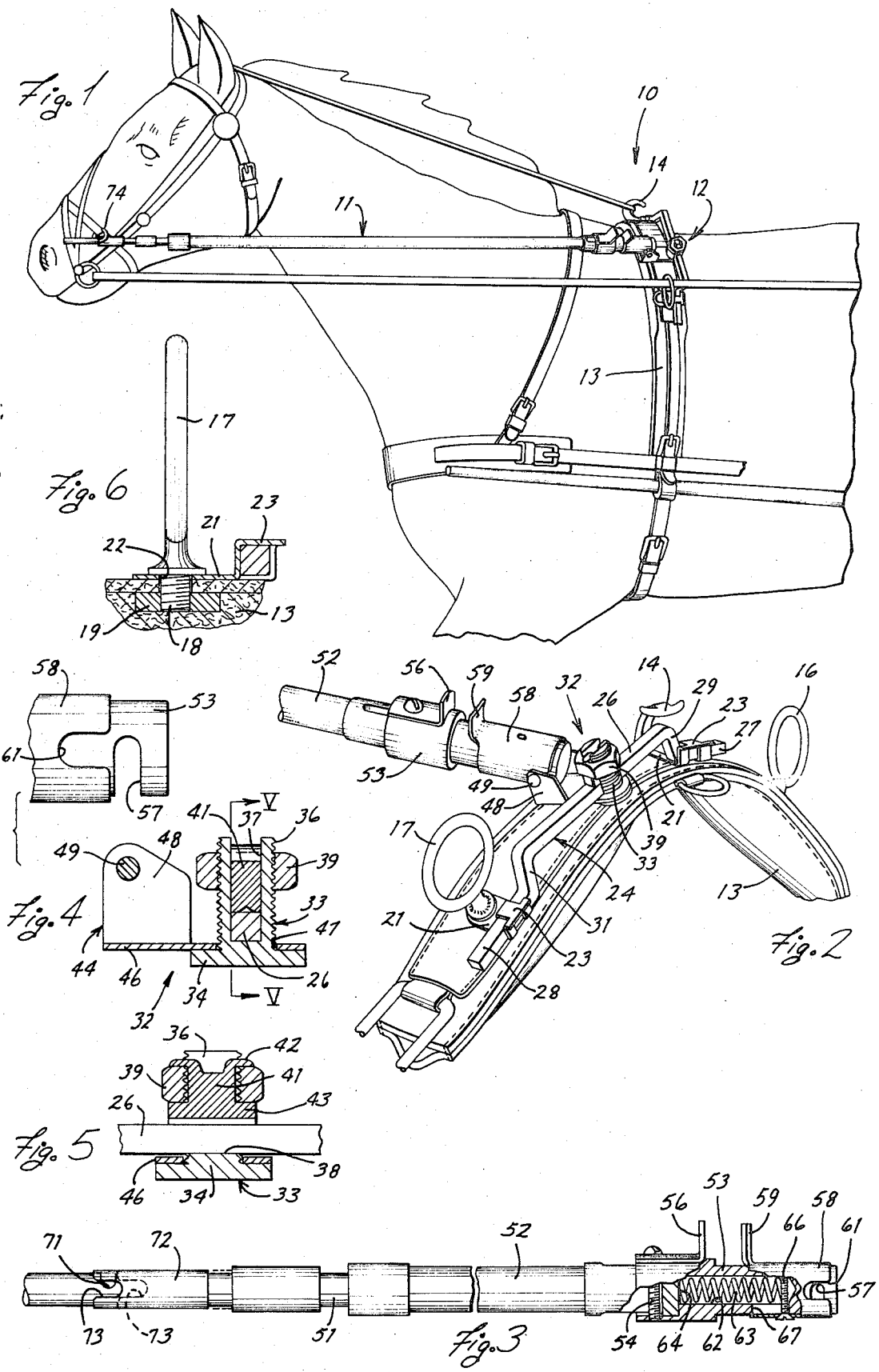

HEAD POLE SUPPORT FOR HORSE HARNESS

FIELD OF THE INVENTION

This invention relates to a device for controlling the position in which a horse is permitted to hold its head and, in particular, to a head pole attachment which can be easily mounted on the harness and disposed adjacent one side of the head for preventing the horse from holding or moving its head into a sidewise position.

BACKGROUND OF THE INVENTION

Many horses, such as trotters, used for pulling carriages or sulkies have a habit of turning their heads to one side or the other when they are running, particularly during a race. This greatly interferes with the speed of the horse and also makes the horse much more difficult to manage.

To overcome this problem, it has been an often used practice to provide an elongated control pole positioned adjacent the horse, which control pole is secured to the harness and has its forward end positioned directly adjacent one side of the horse's head. The control pole permits the head to move freely in a forward direction but restricts or prevents the horse from turning its head sidewardly in the direction of the pole. While the control pole is effective in maintaining the horse's head in a straight or forward direction, nevertheless the prior known pole constructions have not met with widescale acceptance since they have been extremely difficult to attach and remove from the harness. The prior known pole structures have, to the best of my knowledge, generally utilized flexible ties for securing the opposite ends of the pole to the harness. However, this structure is undesirable since the ties make the pole difficult to attach to or remove from the harness, particularly after a race, since the tie becomes extremely tight and removal of the control pole is thus difficult. Further, this type of attachment structure does not always provide for a secure attachment of the rearward end of the pole, nor does it readily permit the rearward end of the pole to be securely but fixedly attached to the harness in the most optimum location for controlling the particular horse involved.

Accordingly, it is an object of the present invention to provide an improved control pole structure adapted to be mounted on the harness for restricting sideward movement of the head of a horse, which control pole structure can be easily attached to or removed from the harness.

A further object of the present invention is to provide a control pole attachment, as aforesaid, which can have the rearward end thereof securely attached to the harness, such as the back pad of the harness, while at the same time the control pole can be easily and efficiently attached to or removed from the harness.

Still a further object of the present invention is to provide a control pole attachment, as aforesaid, which includes a universal-type coupling structure coacting between the pole and the harness, which coupling structure can also be selectively moved laterally between the guide line ring and the water check hook to permit the pole to be positioned in the most desirable location.

Another object of the present invention is to provide a control pole attachment, as aforesaid, which can be easily mounted on a conventional back pad of a harness without requiring any modification or variation in the structure thereof.

These and other objects of the present invention will be apparent to persons acquainted with devices of this type upon reading the following specification and inspecting the accompanying drawings.

BRIEF DESCRIPTION OF THE DRAWINGS

FIG. 1 illustrates the head pole attachment of the present invention and its relationship to the harness and the water check hook.

FIG. 2 is a fragmentary, perspective view illustrating therein the rearward end of the pole and the mounting structure used for attaching same to the back pad of the harness.

FIG. 3 is a side elevational view, taken partially in cross section, and illustrating the telescoping pole assembly.

FIG. 4 is an exploded, fragmentary view illustrating the relationship between the rearward end of the pole assembly and the universal coupling structure, the coupling structure being illustrated in cross section.

FIG. 5 is a fragmentary, sectional view taken substantially along the line V—V in FIG. 4.

FIG. 6 is a fragmentary view taken partially in cross section and illustrating the manner in which the line guide ring, as secured to the back pad, coacts with the mounting plates for the bracket structure.

Certain terminology will be used in the following description for convenience in reference only and will not be limiting. The words "upwardly", "downwardly", "rightwardly" and "leftwardly" will designate directions in the drawings to which reference is made. The word "front" or "forwardly" will refer to the front of the horse, namely the leftward side in FIG. 1. The words "inwardly" and "outwardly" will refer to directions toward and away from, respectively, the geometric center of the device and designated parts thereof. Such terminology will include the words above specifically mentioned, derivatives thereof, and words of similar import.

SUMMARY OF THE INVENTION

In general, the objects and purposes of the present invention are met by providing a bracket structure which can be attached to a conventional harness back pad. The bracket structure includes an elongated bracket member which extends between and is mounted on a pair of bracket plates, which plates are secured to the back pad by being attached to the water check hook and one of the line guide hooks. An adjustable coupling device is mounted on the bracket member and can be adjustably positioned longitudinally thereof so as to be disposed at any selected location between the water check hook and the line guide ring. The adjustable coupling device includes a swivel member mounted for swinging movement about a first axis, which swivel member in turn has a pivot pin mounted thereon providing a second pivot axis substantially perpendicular to the first axis. A telescoping pole assembly is provided with a slot in the rearward end thereof to receive therein said pivot pin. A spring-urged retainer sleeve is slidably mounted on the rearward end of the pole for retaining the pivot pin within the slot to pivotally connect the pole to the swivel member. The retainer sleeve can be manually moved in opposition to the urging of the spring to permit the pin to be withdrawn from the slot. The forward end of the pole is preferably provided with a similar slot and spring-urged retaining sleeve and is designed for coaction with a ring or other suitable member mounted on a portion of the harness disposed on the horse's head, whereby the forward end of the pole is thus maintained in a position directly adjacent one side of the head.

DETAILED DESCRIPTION

FIG. 1 illustrates therein a head pole attachement 10 constructed according to the present invention. The head pole attachment 10 includes a telescoping pole assembly 11 having the forward end thereof positioned adjacent the head of the horse. The rearward end of the pole assembly 11 is, in the illustrated embodiment, pivotally connected to the harness back pad 13 by means of an intermediate mounting structure 12.

The harness back pad 13 is of conventional construction and is designed to encircle the body of the horse just rearwardly of the horse's front legs. The back pad 13 has a water check hook 14 mounted at the upper central portion thereof, and right and left terret or line guide rings 16 and 17, respectively, are also secured to the back pad on laterally opposite sides of the water check hook 14. The right and left guide rings 16 and 17 are each provided with a threaded stud 18 (FIG. 6) extending into the interior of the back pad, which threaded stud is engaged within a nut 19 captivated within the interior of the back pad. The water check hook 14 is also provided with a threaded stud which extends through the back pad and is provided with a nut on the lower end thereof for securing the water check hook to the back pad. This structure is conventional and further description of same is not believed necessary.

Considering now the mounting structure 12, same includes a pair of substantially identical mounting plates 21 each having an opening 22 therethrough, whereby one of the mounting plates is thus clampingly held between the water check hook 14 and the back pad 13, with the other mounting plate being clampingly held between one of the line guide rings (the guide ring 17 in the illustrated embodiment) and the back pad 13. Each mounting plate has a substantially tubular guide portion 23 provided on one edge thereof, which guide portions extend toward one another when mounted on the back pad as illustrated in FIG. 2. An elongated rodlike bracket member 24 is adapted to be mounted on and extends between the pair of mounting plates 21. The bracket member 24 includes an elongated center or base portion 26 and opposite leg portions 27 and 28. The leg portions 27 and 28 are each laterally offset from the center portion 26 by intermediate transverse portions 29 and 31. The leg portions 27 and 28 are inclined at a slight angle relative to one another and relative to the center portion 26 in order to compensate for the curvature of the back pad when same is mounted on the horse.

The bracket member 24 has an adjustable coupling device mounted thereon, which adjustable coupling device is generally designated at 32. The coupling device includes a bolt 33 which has a head portion 34 positioned below the center portion 26 of the bracket member. The bolt also has a threaded shank portion 36 extending upwardly from the bolt and provided with an elongated, axially extending slot 37 therein, which slot is defined by a bottom wall 38 (FIG. 5) which is spaced slightly upwardly from the undersurface of the head 34 for a purpose to be explained hereinafter. The slot 37 has a width substantially equal to or slightly larger than the width of the center portion 26, whereby the center portion is thus slidably received within the slot 37 and is positioned directly adjacent the bottom wall 38. The bolt 33 can thus be slidably moved longitudinally of the center portion 26.

The bolt 33 is retained and is fixedly secured to the center portion 26 of the bracket member 24 by means of a nut 39 which is threadably engaged over the free end of the threaded shank portion 36. The nut 39 has a blocklike insert or clamping member 31 disposed within the interior thereof. The insert has a width substantially equal to the width of the center portion 26 so that the insert 41 can also be freely slidably received within the slot 37 formed in the bolt. The insert 41 is provided with a pair of tabs 42 on the upper edge thereof which overlap the nut 39 (FIG. 5) for axially interlocking the insert to the nut while also permitting free rotation of the nut relative to the insert. The insert 41 also has a guide portion 43 which projects downwardly below the lower edge of the nut and is adapted to be moved downwardly into engagement with the upper surface of the center portion 26. The nut 39, when tightly threaded onto the bolt 33, causes the center portion 26 to be tightly fixedly clamped between the insert 41 and the bottom wall 38.

The adjustable coupling device 32 also includes a swivel member 44 associated with the bolt 33. The swivel member has a base plate 46 containing an opening 47 therethrough, which opening permits the threaded shank portion 36 of the bolt to extend therethrough so that the base plate 46 can be disposed directly adjacent the undersurface of the head 34. Since the bottom wall 38 of the slot 37 is spaced upwardly from the undersurface of the bolt head by a distance slightly greater than the thickness of the base plate 46, the base plate will be freely rotatably confined between the head 34 and the center portion 26 to thus permit the swivel member 44 to freely swing about the longitudinally extending axis of the bolt 33.

The swivel member 44 also has a pair of substantially parallel ears fixedly, here integrally, secured to and extending upwardly from the opposite edges of the base plate 46. A hinge pin 49 is mounted to and extends between the ears 48, thereby defining a further pivot axis which is substantially perpendicular to the longitudinal axis of the bolt 33. Since the swivel member is freely swingable about a first axis which is substantially concentric with the longitudinal axis of the bolt, and inasmuch as the pivot pin 49 permits pivotal movement about a second axis which is substantially perpendicular to the first axis, the swivel member thus basically permits swinging movement within two substantially perpendicular planes, thereby providing a substantially universal pivoting movement between the harness back pad 13 and the rearward end of the pole assembly 11.

Considering now the pole assembly 11, same includes a pair of pole sections 51 and 52, at least the latter being of a tubular construction to enable the pole section 51 to be freely telescopically supported therein. The pole section 52 has an end member 53 fixedly secured to the rearward end thereof, as by a screw 54. The screw 54 also fixedly secures to the rearward end of the pole section 52 an L-shaped gripping tab 56. The end member 53 is also provided with a transverse slot 57 formed therein adjacent the rearward end thereof, which transverse slot 57 extends slightly more than halfway through the end member and has a width suitable to permit it to accommodate therein the pivot pin 49.

A releasable coupling member 58, constructed as a sleeve, is slidably mounted on the end member 53 in surrounding relationship therewith, and is provided with a gripping tab 59 fixedly, here integrally, secured to the forward end thereof. The gripping tab 59 is axially spaced from but substantially opposite the gripping tab 56 to permit the two tabs to be readily gripped with one hand. The releasable coupling member 58 is also provided with a substantially diametrically opposite pair of slots formed in the free rearward end thereof, which slots extend axially of the coupling member and have a width sufficient to accommodate therein the pivot pin 49. The opposed pair of slots 61 are positioned to overly and prevent access to the bottom portion of the transverse slot 57 when the coupling member 58 is in its rearwardmost position (as illustrated in FIG. 3), in which position the coupling member overlaps and substantially closes the free end of the transverse slot 57.

The releasable coupling member 58 is normally spring-urged into the position illustrated in FIG. 3 and for this purpose there is provided a blind bore 62 formed within the end member 53. A conventional compression spring 63 is disposed within the bore 62 and has one end thereof in abutting engagement with an end wall 64. The other end of the spring 63 bears against a transverse screw member 66 which is fixedly secured to the coupling member 58. The transverse screw member 66 is slidably guided within a pair of diametrically opposed, axially elongated slots 67 which are formed in the end member 53. The spring 63 thus normally resiliently urges the transverse screw 66 rearwardly (rightwardly in FIG. 3) into a position wherein the screw is disposed adjacent the rearward ends of the slots 66, in which position the releasable coupling sleeve 58 is disposed to overlap and close the free end of the transverse slot 57.

The forward end of the pole assembly 11 is provided with a releasable coupling structure thereon which is substantially identical to the releasable coupling structure provided adjacent the rearward end of the pole assembly. Specifically, the pole section 51 is provided with a transverse slot 71 therein adjacent the front end of the pole section, which transverse slot extends partway across the width of the pole section. A releasable coupling sleeve 52 is slidably positioned on and surrounds the forward end of the pole section 51, and is also provided with a pair of diametrically opposed, axially extending slots 73 formed in the forward end thereof, which slots are disposed to overlap the bottom portion of the transverse slot 71 when the coupling sleeve 72 is in its forwardmost position, as illustrated by solid lines in FIG. 3. In this position, the coupling sleeve 72 is normally resiliently urged into its forwardmost position (as illustrated by solid lines in FIG. 3) by means of a spring structure which is substantially similar to the spring structure provided adjacent the rearward end of the pole assembly, as illustrated on the right side of FIG. 3. The coupling sleeve 72 can be manually released by axially pulling same rearwardly into the position illustrated by dotted lines in FIG. 3, in which position the sleeve 72 no longer overlaps the transverse slot 71. The transverse slot 71 is designed to receive therein a portion of a ring 74 (FIG. 1), which ring is attached to the harness structure associated with the head of the horse, whereby the frontward end of the pole assembly can thus be attached directly to the head of the horse adjacent one side thereof.

OPERATION

The assembly and operation of the device constructed according to the present invention will be briefly described to insure its complete understanding thereof.

When the head pole attachment 10 of the present invention is to be utilized, and assuming that the device is initially disassembled, the swivel member 44 is mounted on the bolt so that the base plate 46 is positioned directly adjacent the undersurface of the bolt head. The bolt 33 is then slidably inserted over the center portion 26 of the bracket member 24 so that the head 34 of the bolt is disposed below the center portion 26. The base plate 46 is thus confined between the bolt head and the center portion 26 of the bracket member. The nut 39 and the captive insert 41 are then positioned over the threaded shank of the bolt, with the guide portion 43 of the insert 41 being slidably disposed in the slot 37. The nut 39 is then threaded onto the shank of the bolt until the insert 41 is positioned adjacent the center portion 26, with the center portion 26 being closely confined between the end wall 38 of the slot and the insert 41. The nut 39 is preferably initially tightened to a sufficient extent to closely confine the center portion 26, while still permitting relative sliding movement between the center portion 26 and the bolt 33. The pair of mounting plates 21 are then mounted on the opposite end portions 27 and 28 of the bracket member 24 (assuming that they have not been previously mounted thereon) by causing the end portions to be slidably inserted through the tubular guide portions 23. The bracket member 24 having the mounting plates 21 and the adjustable coupling device 32 mounted thereon is then disposed adjacent the upper surface of the back pad 13. The water check hook 14 and one of the line guide rings 16 or 17 is then disconnected from the back pad, whereupon the threaded studs formed on the hook 14 and line guide 16 or 17 are inserted through the opening formed in the mounting plates 21. The ring and hook are then reconnected to the back pad to thus clampingly engage the mounting plates 21 therebetween. This results in the mounting plates 21 and the bracket member 24 being fixedly secured relative to the back pad 13, with the adjustable coupling device 32 being slidable longitudinally of the center portion 26 to permit it to be laterally positioned in a desired location between the water check hook 14 and the selected line guide ring 16 or 17.

The pole assembly can then be suitably connected by connecting the front end of the pole to the ring 74, and by connecting the rear end of the pole to the swivel member 44. Since the pole sections 51 and 52 telescope within one another, the pole can be readily varied in length to permit it to be readily mounted between the swivel member 44 and the ring 74. Further, either end of the pole assembly can be first connected to the harness without interfering with the simplicity of the attachment operation. For purposes of illustration, it will be assumed that the rearward end of the pole assembly is first connected to the swivel member 44, with the front end of the pole assembly then being connected to the ring 74.

To permit the rearward end of the pole assembly 11 to be connected to the swivel member 44, the tabs 56 and 59 are initially amnually gripped to axially move the retaining sleeve 58 in opposition to the urging of the spring 63, thereby totally uncovering the transverse slot 57. The end member 53 as provided on the pole assembly is then positioned directly over the pivot pin 49 and is moved downwardly so that the pivot pin is slidably inserted into the bottom of the slot 57. The gripping tab 59 is then released, whereupon the spring 63 moves the retainer sleeve 58 rearwardly till the screw member 66 abuts the rearward ends of the slots 67. The rearward end of the retainer sleeve 58 thus axially overlaps the free open end of the transverse slot 57, while the diametrically opposite axial slots 61 overlap the inner end of the transverse slot 57. The pivot pin 49 is thus retained with the transverse slot 57 by the sleeve 58, while at the same time the pivot pin 49 extends through the transverse slot 57 and the diametrically opposite axial slots 61. The pivot pin 49 is thus confined within the rearward end of the pole assembly 11, but still permits the pole assembly to freely pivotally move within a plane substantially perpendicular to the axis of the pivot pin 49. Further, since the swivel plate 44 is pivotally movable about the longitudinal axis of the bolt 33, which axis is substantially perpendicular to the axis of the pivot pin 49, the complete pole assembly 11 is swingably movable within two substantially perpendicular planes, thereby providing the pole assembly with a substantially universal pivoting motion.

After the rearward end of the pole assembly has been attached to the swivel member 44 as explained above, the forward end of the pole assembly is then positioned adjacent the head of the horse. The front releasable coupling sleeve 72 is retracted in opposition to the urging of a spring to thus uncover the transverse slot 71. The ring 74 is inserted to the bottom of the slot 71, and the retainer sleeve 72 is then resiliently returned to its forwardmost position to lock the ring within the bottom of the slot 71.

With the pole attached to the harness as explained above, the horse is not permitted to turn its head sidewardly, whereupon the horse is thus forced to continually maintain his head in a straight position. This permits the horse to continually run at a more uniform and faster speed, and also permits easier handling of the horse. Further, since the pole assembly 11 is of a telescopic construction, it will axially lengthen and contract to permit the horse's head to have the necessary freedom of movement in the forward direction of travel, while at the same time the pole assembly will restrict or prevent the horse from tilting or moving its head sidewardly.

When it is desirable to remove the pole assembly 11, it is only necessary to pull the front releasable retainer sleeve 72 rearwardly to thus release the ring 74 from the transverse slot 71. Likewise, the rear retainer sleeve 58 is pulled forwardly in opposition to the urging of the spring 63, thereby releasing the pivot pin 49 from the transverse slot 57. The pole assembly 11 can thus be easily removed from, or attached to, the harness in a very efficient and simple manner. Further, the position of the pole can be varied to accommodate the mannerisms of each horse merely by slidably moving the adjustable coupling device longitudinally of the center portion 26, with the coupling device 32 being fixedly secured in its selected position by tightening the nut 39 to clamp the center portion 26 between the insert 41 and the bottom wall 38. Thus, the adjustable coupling device 32 can be positioned closely adjacent either the guide ring or the water check hook or can be positioned at any intermediate position therebetween. Further, the adjustment in the position of the device 32 can likewise be performed after the rearward end of the pole assembly 11 has been connected to the swivel member 44 since the adjusting device 32 permits a universal pivotal movement between the bracket member 24 and the pole assembly.

While the invention as described above has illustrated the bracket member 24 as being mounted between the water check hook 14 and the left guide ring 17, it will be apparent that the structure could likewise be mounted between the water check hook 14 and the right guide ring 16 if desired, thereby enabling the pole assembly 11 to be disposed adjacent the opposite side of the horse's head.

The structure of the present invention, as described above, is highly desirable since the mounting structure, particularly the bracket member 24 and the adjustable coupling device 32, once they have been mounted on the back pad 15, can be permitted to remain on the back pad 13 even though the pole assembly 11 is not being utilized. Since the bracket 24 and adjustable coupling device 32 are of very light weight and occupy very little space, they do not interfere with the use of the back pad 13 even when the pole assembly 11 is not being utilized. The pole assembly 11 can thus be quickly attached to or removed from the harness only when the back pack 13 is being utilized with a horse which requires the use of the pole assembly 11.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A head pole device adapted for attachment to the head and body portions of a harness of a horse, comprising:
    elongated telescopic pole means including first and second elongated pole sections telescopically associated with one another for permitting the length of said pole means to be selectively varied;
    connecting means associated with the forward end of said pole means for releasably connecting same to the head portion of the harness whereby the forward end of said pole means can be disposed adjacent one side of a horse's head;
    mounting means releasably connected to the body portion of said harness, said mouting means including a mounting member stationarily secured to the body portion of said harness;
    coupling means associated with the rearward end of said pole means for permitting said pole means to be releasably connected to the body portion of the harness while permitting universal pivotal movement of said pole relative to the body portion of the harness;

said coupling means including first and second separable coupling portions pivotally connected together when said pole means is attached to the body portion of said harness, said first coupling portion being associated with the rearward end of said pole means and said second coupling portion being mounted on said mounting means;

said second coupling portion including swivel means connected to said mounting member and swingable relative thereto about a first axis which extends substantially transverse to the longitudinally extending direction of said pole means when same is mounted on the harness;

said coupling means further including releasable hinge means coacting between said first coupling portion and said swivel means for permitting swinging movement about a second axis which is substantially transverse to both said first axis and the longitudinally extending direction of said pole means;

said hinge means including a hinge pin mounted on one of said pole means and said swivel member, said hinge means further including a substantially transverse slot formed in the other of said pole means and said swivel means and adapted to receive therein said hinge pin; and releasable retainer means movably mounted on one of said coupling portions and coacting with the other coupling portion when said first and second coupling portions are pivotally connected for preventing said coupling portions from being separated, said retainer means being positionable to partially close said slot to retain said hinge pin within said slot to thus pivotally but releasably connect said pole means to said swivel means, said retainer means being manually movable into a released position for permitting said first and second coupling portions to be freely separated from one another to enable the rearward end of said pole means to be disconnected from the body portion of said harness.

2. A device according to claim 1, wherein said mounting member comprises an elongated rodlike guide member stationarily mounted on the body portion of said harness, said guide member extending between a line guide ring and a water check hook as mounted on the body portion of said harness, whereby said guide member extends in a direction substantially transverse to the longitudinal direction of said pole means;

adjustment means slidably associated with said guide member and connected to said swivel means for permitting said swivel means to be slidably moved longitudinally of said guide member and fixedly secured thereto in any selected position therealong.

3. A device according to claim 2, wherein said elongated guide member includes a substantially U-shaped center portion and leg portions extending outwardly in opposite directions from the free ends of said U-shaped center portion, a first mounting plate being adapted to be clamped between the water check hook and the body portion of the harness, said mounting plate having guide means for slidably receiving therein one leg portion of the guide member, a second mounting plate being adapted to be clamped between the line guide ring and the body portion of the harness, the second mounting plate having guide means thereon for slidably receiving therein the other leg portion of the elongated guide member.

4. A device according to claim 2, wherein said adjustment means includes threaded bolt means having a threaded shank provided with an axially elongated slot formed therein, said slot having a width permitting reception therein of said elongated guide member, and nut means threadably engaged with the shank of said bolt for permitting said elongated guide member to be clampingly held within the bottom of said slot.

5. A device according to claim 4, wherein the bottom of the slot as formed in the shank of said bolt is laterally spaced from the undersurface of the bolt head, whereby said guide member is maintained a predetermined distance from the undersurface of said bolt head, and said swivel means including a base plate pivotally supported on said shank, said base plate having a flange portion disposed adjacent the undersurface of said bolt head and confined between said bolt head and said guide member rod, said flange portion being freely swingable relative to said bolt about the longitudinal axis thereof.

6. A device according to claim 5, wherein said hinge pin is mounted on said swivel means, said hinge pin being laterally spaced from said bolt and extending with its axis substantially perpendicular to the longitudinal axis of said bolt, and said transverse slot being formed in said pole means adjacent the rearward end thereof, said slot extending transversely of said pole means and extending only partway through the width thereof, and said retainer means including a retainer sleeve slidably mounted on said pole means adjacent the rearward end thereof, said retainer sleeve having a portion positioned to axially overlap the free end of said slot for permitting said hinge pin to be retained within said slot, said retainer means further including spring means associated with said retainer sleeve for normally resiliently urging same into a position wherein said retainer sleeve overlaps said slot for retaining said hinge pin therein.

7. A device according to claim 2, wherein said hinge pin is mounted on said swivel means, said hinge pin being laterally spaced from said bolt and extending with its axis substantially perpendicular to the longitudinal axis of said bolt, and said transverse slot being formed in said pole means adjacent the rearward end thereof, said slot extending transversely of said pole means and extending only partway through the width thereof, and said retainer means including a retainer sleeve slidably mounted on said pole means adjacent the rearward end thereof, said retainer sleeve having a portion positioned to axially overlap the free end of said slot for permitting said hinge pin to be retained within said slot, said retainer means further including spring means associated with the retainer sleeve for normally resiliently urging same into a position wherein said retainer sleeve overlaps said slot for retaining said hinge pin therein.

8. A coupling structure for releasably attaching the rearward end of a head pole to the body portion of a harness of a horse, said coupling structure comprising:
mounting means releasably connected to the body portion of said harness, said mounting means including an elongated mounting member stationarily secured to the body portion of said harness, said mounting member being elongated in a direction which is substantially transverse to the lengthwise direction of the horse;

releasable coupling means for operatively interconnecting the rearward end of said pole to said mounting means while permitting universal pivotal movement of said pole relative to the body portion of said harness, said coupling means including first and second separable coupling members with said first coupling member bein attachable to the rearward end of said pole, said first and second coupling members including separable hinge means coacting therebetween for permitting relative pivotal movement between said first and second coupling members about a first axis which extends substantially transverse to the longitudinally extending direction of said pole;

swivel means operatively connected between said second coupling member and said mounting member for permitting relative swinging movement therebetween about a second axis which extends substantially transverse to both said first axis and the longitudinally extending direction of said pole, said swivel means including a swivel member nonrotatably supported on said mounting member and supporting said second coupling member thereon for permitting oscillation of said second coupling member relative to said swivel member about said second axis; and adjustment means coacting between said mounting member and said swivel member for permitting said swivel member to be displaced longitudinally along said mounting member and fixedly secured relative thereto at any one of a plurality of selected positions.

9. A coupling structure according to claim 8, wherein said swivel member is slidably supported on said mounting member for movement longitudinally thereof, said swivel member including a substantially cylindrical pinlike portion projecting upwardly from said mounting member in a direction substantially transverse to the longitudinally extending direction thereof, and said second coupling member including a sleevelike portion rotatably supported on and surrounding the cylindrical pinlike portion of said swivel member.

10. A coupling structure according to claim 8, wherein said swivel member includes a pinlike member having a groove therein in which is positioned said elongated mounting member for enabling said swivel member to be slidably displaced longitudinally of said mounting member, said swivel member having an enlarged head portion formed on one end thereof, and said second coupling member including a substantially planar platelike portion having an opening therethrough through which extends said pinlike member, said platelike portion being disposed between said mounting member and the enlarged head portion of said swivel member for being confined therbetween while permitting said second coupling member to be angularly displaced about said second axis as defined by the longitudinal axis of said swivel member, and said second coupling member including a pair of ears fixedly secured to the opposite sides of said platelike portion and projecting upwardly therefrom in substantially parallel relationship, and said first coupling member including a rodlike portion fixedly secured to the rearward end of said pole and disposed between said pair of parallel ears, said pair of ears and said rodlike portion including separable pivot pin means and slot means coacting therebetween for permitting pivotal movement about said first axis, and a spring-urged retainer sleeve slidably mounted on said first coupling member for normally covering the free end of said slot means for retaining said pivot pin means therein.

* * * * *